US010771266B2

(12) United States Patent
Nowottnick et al.

(10) Patent No.: US 10,771,266 B2
(45) Date of Patent: Sep. 8, 2020

(54) METHOD FOR CONFIGURING A TRANSPONDER, TRANSPONDER AND BASE STATION

(71) Applicant: NXP B.V., Eindhoven (NL)

(72) Inventors: Juergen Nowottnick, Hamburg (DE); Frank Graeber, Seestermuehe (DE)

(73) Assignee: NXP B.V., Eindhoven (NL)

( * ) Notice: Subject to any disclaimer, the term of this patent is extended or adjusted under 35 U.S.C. 154(b) by 165 days.

(21) Appl. No.: 16/040,813

(22) Filed: Jul. 20, 2018

(65) Prior Publication Data

US 2019/0109718 A1 Apr. 11, 2019

(30) Foreign Application Priority Data

Oct. 10, 2017 (EP) .................................... 17195646

(51) Int. Cl.
| | |
|---|---|
| *H04L 9/32* | (2006.01) |
| *H04L 9/08* | (2006.01) |
| *G07C 9/00* | (2020.01) |
| *H04L 9/06* | (2006.01) |
| *G06F 7/58* | (2006.01) |
| *H04B 1/59* | (2006.01) |

(52) U.S. Cl.
CPC ............ *H04L 9/3273* (2013.01); *G06F 7/588* (2013.01); *G07C 9/00309* (2013.01); *G07C 9/00857* (2013.01); *H04L 9/0662* (2013.01); *H04L 9/0866* (2013.01); *H04L 9/3278* (2013.01); *H04L 2209/80* (2013.01); *H04L 2209/84* (2013.01)

(58) Field of Classification Search
CPC ... H04L 9/3273; H04L 9/0866; H04L 9/3278; H04L 9/0662; H04L 2209/84; H04L 2209/80; H04L 9/0869; H04L 9/3247; G06F 7/588; G07C 9/00857; G07C 9/00309; H04B 1/59
See application file for complete search history.

(56) References Cited

U.S. PATENT DOCUMENTS

| | | | |
|---|---|---|---|
| 2002/0049904 A1 | 4/2002 | Nowottnick et al. | |
| 2003/0093663 A1* | 5/2003 | Walker ................. | H04L 9/3271 713/150 |
| 2004/0080398 A1* | 4/2004 | Ghabra ................. | B60R 25/04 340/5.61 |

(Continued)

OTHER PUBLICATIONS

M. Asim, J. Guajardo, S. S. Kumar and P. Tuyls, "Physical Unclonable Functions and Their Applications to Vehicle System Security," VTC Spring 2009—IEEE 69th Vehicular Technology Conference, Barcelona, 2009, pp. 1-5. (Year: 2009).*

(Continued)

*Primary Examiner* — Darren B Schwartz
(74) *Attorney, Agent, or Firm* — Rajeev Madnawat

(57) ABSTRACT

In accordance with a first aspect of the present disclosure, a method for configuring a transponder is conceived, comprising: deriving a signature from a physical unclonable function; verifying said signature; initiating a key training sequence between a base station and the transponder in dependence on a result of verifying the signature. In accordance with other aspects of the present disclosure, a corresponding computer program, transponder and base station are provided.

14 Claims, 13 Drawing Sheets

(56) References Cited

U.S. PATENT DOCUMENTS

| | | | |
|---|---|---|---|
| 2005/0023901 A1* | 2/2005 | Ghabra | B60R 25/04 |
| | | | 307/10.5 |
| 2006/0003739 A1* | 1/2006 | Sasakura | G06K 19/10 |
| | | | 455/411 |
| 2006/0208069 A1* | 9/2006 | Gilbert | B60R 25/24 |
| | | | 235/382.5 |
| 2006/0214766 A1 | 9/2006 | Ghabra et al. | |
| 2008/0008265 A1* | 1/2008 | Fischer | G06K 7/0008 |
| | | | 375/309 |
| 2008/0012690 A1* | 1/2008 | Friedrich | H04L 9/3066 |
| | | | 340/10.1 |
| 2008/0270793 A1* | 10/2008 | Nowottnick | H04L 9/3242 |
| | | | 713/168 |
| 2008/0279373 A1* | 11/2008 | Erhart | H04L 9/302 |
| | | | 380/46 |
| 2009/0083833 A1* | 3/2009 | Ziola | H04L 9/3271 |
| | | | 726/2 |
| 2010/0127822 A1* | 5/2010 | Devadas | H04L 9/3278 |
| | | | 340/5.8 |
| 2011/0091038 A1* | 4/2011 | Thueringer | G06F 21/445 |
| | | | 380/255 |
| 2012/0100833 A1* | 4/2012 | Gao | H04L 9/0844 |
| | | | 455/411 |
| 2012/0131340 A1* | 5/2012 | Teuwen | H04L 9/3273 |
| | | | 713/168 |
| 2013/0010957 A1* | 1/2013 | Yu | H04L 9/0866 |
| | | | 380/260 |
| 2014/0042442 A1 | 2/2014 | Bruley et al. | |
| 2015/0086016 A1* | 3/2015 | Oshida | H04L 9/3239 |
| | | | 380/255 |
| 2015/0156184 A1* | 6/2015 | Tucker | H04L 63/0876 |
| | | | 713/168 |
| 2016/0001741 A1* | 1/2016 | Fazi | B60R 25/209 |
| | | | 701/2 |
| 2016/0080376 A1* | 3/2016 | Temple | H04L 9/00 |
| | | | 713/170 |
| 2017/0048701 A1* | 2/2017 | Ho | H04L 9/3268 |
| 2018/0145838 A1* | 5/2018 | Wang | G06F 21/73 |

OTHER PUBLICATIONS

S. Dolev and N. Panwar. "Peripheral Authentication for Autonomous Vehicles." 15th IEEE International Symposium on Network Computing and Applications (NCA), pp. 282-285, 2016. (Year: 2016).*

Lao, Y. et al. "Reliable PUF-Based Local Authentication With Self-Correction", IEEE Transactions on Computer-Aided Design of Integrated Circuits and Systems, vol. 36, No. 2, pp. 201-213 (Feb. 2017).

* cited by examiner

METHOD FOR CONFIGURING A TRANSPONDER, TRANSPONDER AND BASE STATION

CROSS-REFERENCE TO RELATED APPLICATIONS

This application claims the priority under 35 U.S.C. § 119 of European Patent application no. 17195646.9, filed on Oct. 10, 2017, the contents of which are incorporated by reference herein.

OVERVIEW

The present disclosure relates to a method for configuring a transponder. Furthermore, the present disclosure relates to a corresponding computer program. Furthermore, the present disclosure relates to a transponder and to a base station. Communication systems that comprise a transponder and a base station are often used to enable access to vehicles. In that case, a vehicle access device—e.g. in the form of a physical key—comprises a transponder that is configured to communicate wirelessly with a base station, which is embedded in a vehicle. In operation, the transponder transmits an authentication key to the base station. If the authentication key matches a key stored in the base station, then access to the vehicle may be enabled.

SUMMARY

In accordance with a first aspect of the present disclosure, a method for configuring a transponder is conceived, comprising: deriving a signature from a physical unclonable function; verifying said signature; initiating a key training sequence between a base station and the transponder in dependence on a result of verifying the signature.

In an embodiment, the key training sequence is initiated if an authentication procedure between the transponder and the base station is successful, wherein the success of the authentication procedure is dependent on the result of verifying the signature.

In an embodiment, the authentication procedure uses secret keys stored in the transponder and in the base station.

In an embodiment, the transponder generates an enable signal in dependence on the result of verifying the signature, and proceeds to authenticate to the base station if the enable signal indicates a positive verification result.

In an embodiment, the transponder generates the enable signal by a bit-wise matching of the signature with a stored reference signal.

In an embodiment, the transponder transmits the signature to the base station and the base station verifies said signature.

In an embodiment, the transponder transmits the signature to the base station in encrypted form.

In accordance with a second aspect of the present disclosure, a computer program is provided, comprising non-transient executable instructions that, when executed, carry out a method of the kind set forth.

In accordance with a third aspect of the present disclosure, a transponder is provided, comprising: a signature derivation unit configured to derive a signature from a physical unclonable function; the transponder further comprising: a signature verification unit configured to verify said signature and generate an enable signal in dependence on a result of verifying the signature, wherein the transponder is configured to proceed to authenticate to a base station in response to the enable signal indicating a positive verification result; and/or a signature transmission unit configured to transmit the signature to said base station.

In an embodiment, a vehicle access device comprises a transponder of the kind set forth.

In accordance with a fourth aspect of the present disclosure, a base station is provided, comprising a key training sequence initiation unit, said key training sequence initiation unit being configured to initiate a key training sequence between the base station and a transponder in dependence on a result of verifying a signature derived from a physical unclonable function.

In an embodiment, the key training sequence initiation unit is configured to initiate said key training sequence if an authentication procedure between the transponder and the base station is successful, wherein the success of the authentication procedure is dependent on the result of verifying the signature.

In an embodiment, the base station further comprises a signature receiving unit configured to receive the signature from the transponder and a signature verification unit configured to verify the received signature.

In an embodiment, a vehicle comprises a base station of the kind set forth.

DESCRIPTION OF DRAWINGS

Embodiments will be described in more detail with reference to the appended drawings, in which.

DESCRIPTION OF EMBODIMENTS

Figure 1:
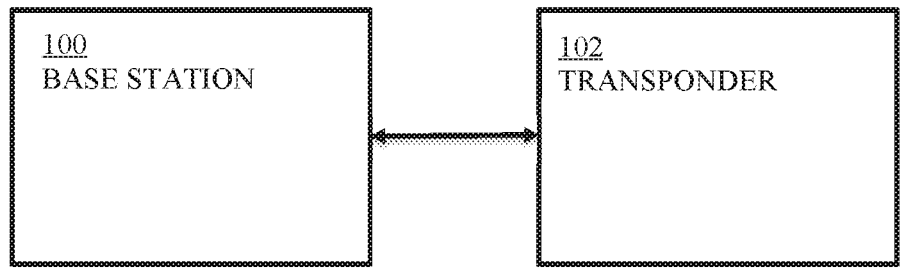
FIG. 1 shows an example of a communication system.

FIG. 1 shows an example of a communication system. The communication system comprises a base station 100 and a transponder 102. As mentioned above, a communication system of this kind is often used to enable access to a vehicle. If the authentication key matches a key stored in the base station, then access to the vehicle may be enabled. The authentication key is typically a secret key, and before the transponder can be used it should be configured in the sense that it should be provided with said key so that said key can be stored in the transponder. A so-called key training sequence is often applied to provide a transponder with said key. More specifically, the final secret key (i.e., authentication key) is derived from a factory-programmed secret key, which is unique for a given device, in a sequence of predefined steps. This approach has some disadvantages. The factory-programmed secret key is either generated outside the transponder's integrated circuit (IC) during production in hardware security module (HSM), and must be programmed into the IC, or it is generated on the IC at the beginning of the lifetime of the product. If an HSM is used an identical copy of the factory-programmed secret key exists in the HSM, which poses a security risk. Furthermore, the time needed to create the factory-programmed secret key increases significantly the test time and thus the IC production cost. In both cases the factory-programmed secret key is stored in an EEPROM and it can thus be cloned, for example using physical attacks or side-channel attacks.

Therefore, in accordance with an aspect of the present disclosure, a method for configuring a transponder is conceived, comprising: deriving a signature from a physical unclonable function (PUF), verifying said signature, and initiating a key training sequence between a base station and the transponder in dependence on a result of verifying the signature. A PUF is a physical entity that is embodied in a physical structure and is easy to evaluate but hard to predict. PUFs are usually implemented in integrated circuits.

In some examples, a factory-programmed secret key (FSK) is written into transponder when said transponder is manufactured. This FSK should also be made available to a base station (e.g., embedded in a vehicle), for example to enable a mutual authentication procedure (i.e., a pairing process) between the transponder and the base station in the factory of a vehicle manufacturer. The FSK is in some examples not transmitted over the low-frequency (LF) interface between a transponder and a base station. However, the FSK can easily be cloned. In accordance with the present disclosure, therefore, the final secret key (or keys) that shall be used for authenticating the transponder to the base station can still be derived from the FSK, but an additional verification (i.e., the verification of a PUF signature) is performed before enabling the derivation of the final secret key. Since it is easier to clone the FSK than the PUF signature, the PUF signature verification provides a higher degree of security. If the PUF signature verification fails, then the transponder's FSK will be regarded as compromised, and the key training sequence for providing the transponder with the final secret key will not be initiated. On the other hand, if the PUF signature verification succeeds, then the key training sequence will be initiated. In a practical and efficient implementation, the presently disclosed method is implemented as a computer program.

Figure 2A:
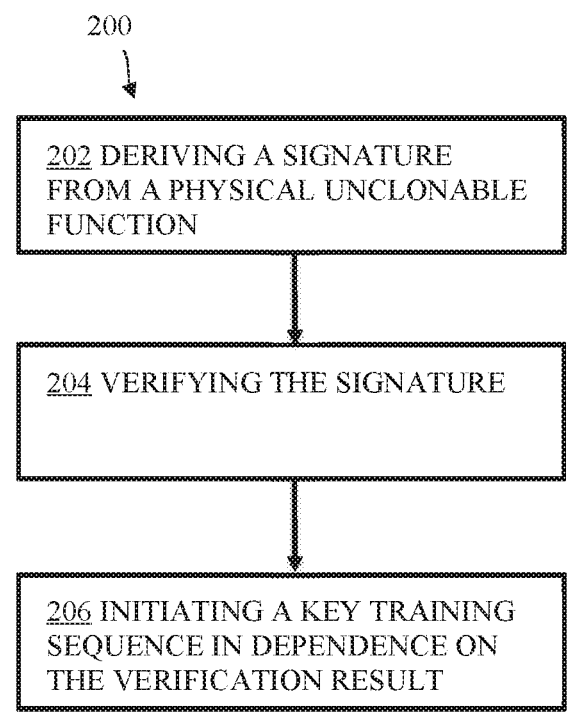
FIG. 2A shows an illustrative embodiment of a method for configuring a transponder.

FIG. 2A shows an illustrative embodiment of a method 200 for configuring a transponder. The method 200 comprises, at 202, deriving a signature from a physical unclonable function, at 204 verifying the signature, and at 206, initiating a key training sequence in dependence on the verification result.

Figure 2B:
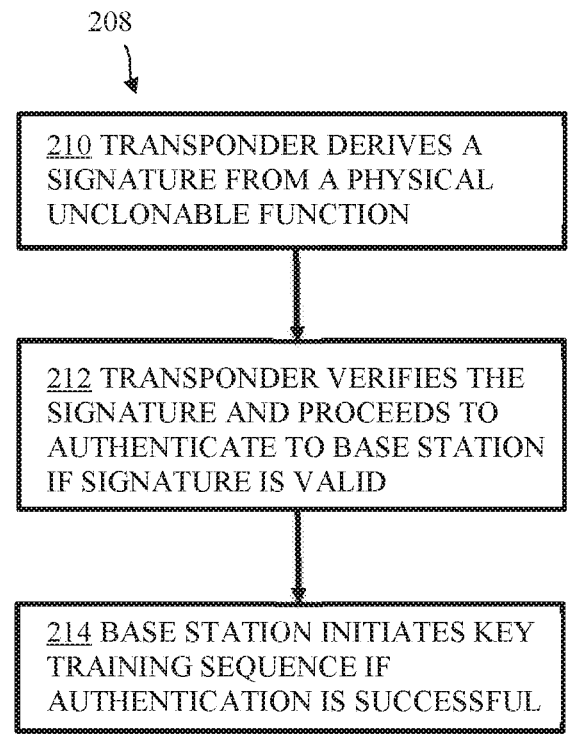
FIG. 2B shows another illustrative embodiment of a method for configuring a transponder.

FIG. 2B shows another illustrative embodiment of a method 208 for configuring a transponder. The method 208 comprises, at 210, that a transponder derives a signature from a physical unclonable function, at 212, that the transponder verifies the signature and proceeds to authenticate to a base station if the signature is valid, and at 214, that the base station initiates a key training sequence if the authentication is successful. In an embodiment, the key training sequence is initiated if an authentication procedure between the transponder and the base station is successful, and the success of the authentication procedure is dependent on the result of verifying the signature. This results in a practical and efficient implementation of the presently disclosed method. Furthermore, the authentication procedure may use factory-programmed secret keys stored in the transponder and in the base station. In this context, a factor-programmed secret key is a secret key that has been written into a transponder by the producer of said transponder, and that has been made available to a base station for use, among others, in an authentication procedure between the transponder and the base station. The factory-programmed secret key is typically unique for each transponder. Furthermore, in a practical and efficient implementation, the transponder generates an enable signal in dependence on the result of verifying the signature, and proceeds to authenticate to the base station if the enable signal indicates a positive verification result. Furthermore, the transponder may generate the enable signal by a bit-wise matching of the signature with a stored reference signal, in order to further increase the efficiency of the process.

Figure 2C:
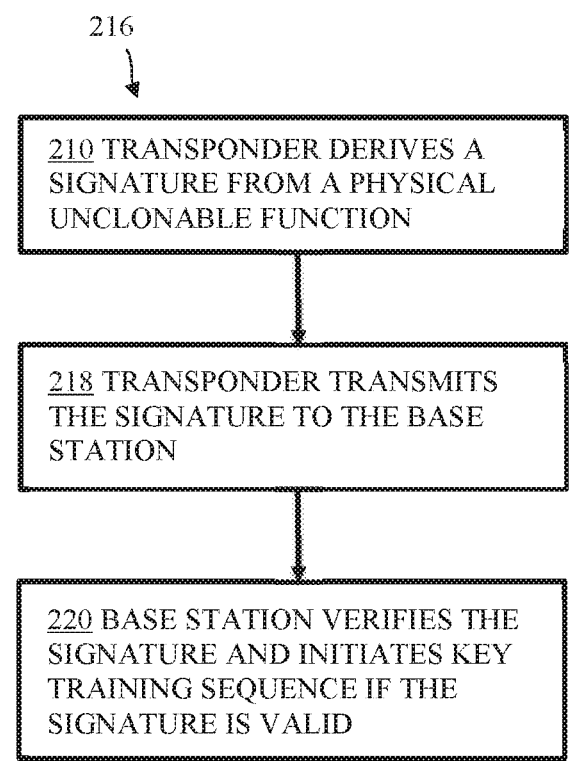
FIG. 2C shows a further illustrative embodiment of a method for configuring a transponder.

FIG. 2C shows a further illustrative embodiment of a method 216 for configuring a transponder. The method 216 comprises, at 210, that a transponder derives a signature from a physical unclonable function, at 218, that the transponder transmits the signature to a base station, and at 220, that the base station verifies the signature and initiates the key training sequence if the signature is valid. This results in another practical and efficient implementation of the presently disclosed method. Furthermore, the transponder may transmit the signature to the base station in encrypted form. In this way, it is less likely that the signature can be retrieved by attackers.

Figure 2D:
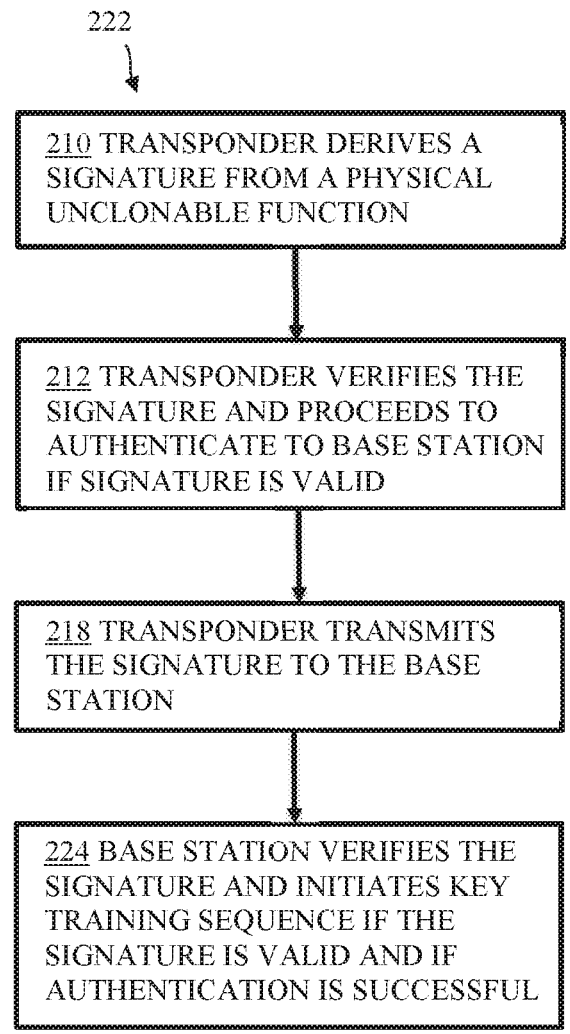
FIG. 2D shows a further illustrative embodiment of a method for configuring a transponder.

FIG. 2D shows a further illustrative embodiment of a method 222 for configuring a transponder. The method 222 comprises, at 210, that a transponder derives a signature from a physical unclonable function, at 212, that the transponder verifies the signature and proceeds to authenticate to a base station if the signature is valid, at 218, that the transponder transmits the signature to the base station, and at 224, that the base station verifies the signature and initiates a key training sequence if the signature is valid and if the authentication is successful. This embodiment of the presently disclosed method combines the embodiment shown in FIG. 2B and the embodiment shown in FIG. 2C. In this way, a practical and efficient implementation may be realized, while the level of security is increased.

Figure 3A:
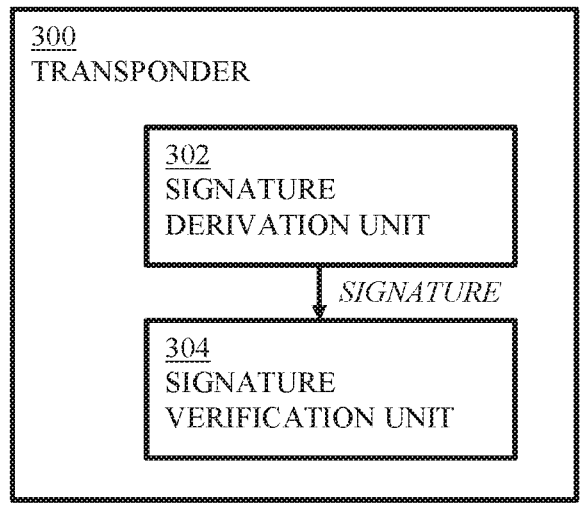
FIG. 3A shows an illustrative embodiment of a transponder.

FIG. 3A shows an illustrative embodiment of a transponder 300. The transponder 300 comprises a signature derivation unit 302 which is operatively coupled to a signature verification unit 304. The signature derivation unit 302 and signature verification unit 304 may for example be implemented as a computer program. In operation, the signature derivation unit 302 derives a signature from a physical unclonable function, and transmits the derived signature to the signature verification unit 304. The signature verification unit 304 verifies the received signature. This embodiment supports the method shown in FIG. 2B.

Figure 3B:
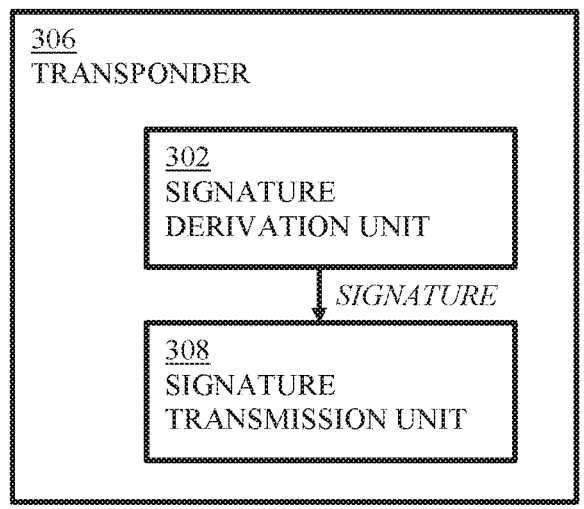
FIG. 3B shows another illustrative embodiment of a transponder.

FIG. 3B shows another illustrative embodiment of a transponder 306. The transponder 306 comprises a signature derivation unit 302 which is operatively coupled to a signature transmission unit 308. The signature derivation unit 302 and signature verification unit 304 may at least partially be implemented as a computer program. Furthermore, the signature transmission unit 308 may comprise, or be coupled to, hardware that enables the wireless transmission of data to the base station. In operation, the signature derivation unit 302 derives a signature from a physical unclonable function, and transmits the derived signature to the signature transmission unit 308. The signature transmission unit 308, in turn, transmits the signature to the base station (not shown). The embodiment supports the method shown in FIG. 2C.

Figure 3C:
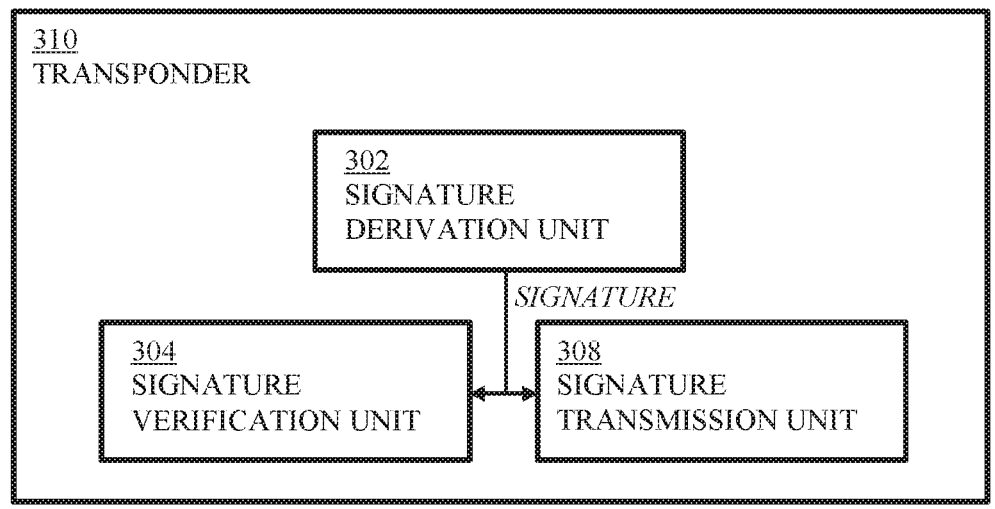
FIG. 3C shows a further illustrate embodiment of a transponder.

FIG. 3C shows a further illustrate embodiment of a transponder 310. The transponder comprises a signature derivation unit 302 which is operatively coupled to a signature verification unit 304 and to a signature transmission unit 308. The signature derivation unit 302, signature verification unit 304 and signature transmission unit 308 may at least partially be implemented as a computer program. Furthermore, the signature transmission unit 308 may comprise, or be coupled to, hardware that enables the wireless transmission of data to the base station. In operation, the signature derivation unit 302 derives a signature from a physical unclonable function, and transmits the derived signature to the signature verification unit 304 and to the signature transmission unit 308. The signature verification unit 304 verifies the received signature. Furthermore, the signature transmission unit 308 transmits the signature to the base station (not shown). This embodiment supports the method shown in FIG. 2D.

Thus, in accordance with an aspect of the present disclosure, a transponder comprises a signature derivation unit configured to derive a signature from a physical unclonable function. Furthermore, transponder comprises a signature verification unit configured to verify said signature and generate an enable signal in dependence on a result of verifying the signature, wherein the transponder is configured to proceed to authenticate to a base station if the enable signal indicates a positive verification result, and/or a signature transmission unit configured to transmit the signature to said base station. This transponder efficiently supports the presently disclosed methods.

Figure 4A:
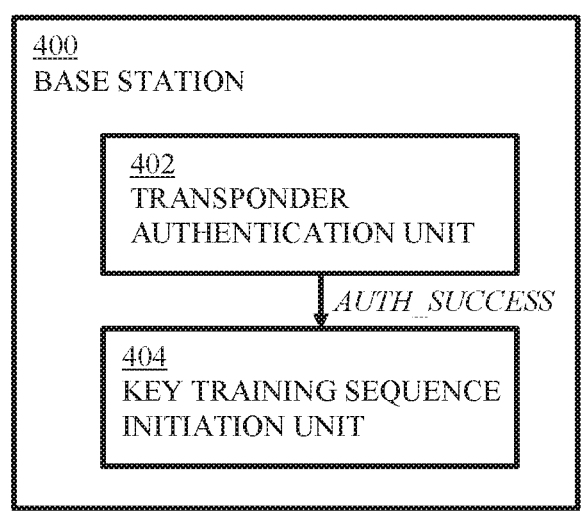
FIG. 4A shows an illustrative embodiment of a base station.

FIG. 4A shows an illustrative embodiment of a base station 400. The base station 400 comprises a transponder authentication unit 402 which is operatively coupled to a key training sequence initiation unit 404. The transponder authentication unit 402 and the key training sequence initiation unit 404 may at least partially be implemented as a computer program. In operation, the transponder authentication unit 402 participates in and/or enables an authentication procedure between the base station and a transponder (not shown). This authentication procedure may be a mutual authentication procedure, in the sense that the base station authenticates itself to the transponder and the transponder authenticates itself to the base station. Furthermore, the transponder authentication unit 402 transmits a signal indicative of authentication success or failure to the key training sequence initiation unit 404. If said signal indicates that the authentication procedure has been successful, the key training sequence initiation unit 404 initiates a key training sequence. This embodiment supports the method shown in FIG. 2B.

Figure 4B:
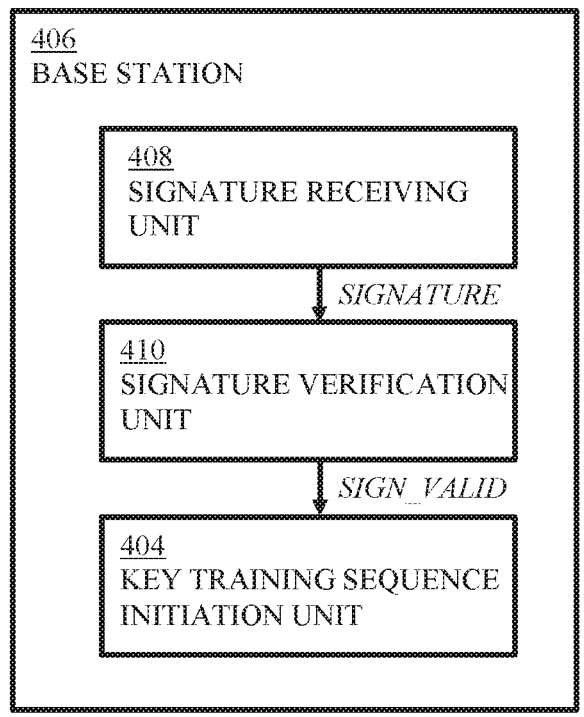
FIG. 4B shows another illustrative embodiment of a base station.

FIG. 4B shows another illustrative embodiment of a base station 406. The base station 406 comprises a signature receiving unit 408 which is operatively coupled to a signature verification unit 410. Furthermore, the base station 406 comprises a key training sequence initiation unit 404 which is operatively coupled to the signature verification unit 404. The signature receiving unit 408, signature verification unit 310 and key training sequence initiation unit 404 may at least partially be implemented as a computer program. Furthermore, the signature receiving unit 408 may comprise, or be coupled to, hardware that enables the wireless receipt of data from a transponder (not shown). In operation, the signature receiving unit 408 receives a signature derived from a PUF from the transponder, and forwards the received signature to the signature verification unit 410. It is noted that, although the signature receiving unit 408 and signature verification unit 410 are shown as separate components, they may equally well be implemented as a single component. The signature verification unit 410 verifies the signature and transmits a signal indicative of a valid or invalid signature to the key training sequence initiation unit 404. If said signal indicates that the signature is valid, then the key training sequence initiation unit 404 initiates a key training sequence. This embodiment supports the method shown in FIG. 2C.

Figure 4C:
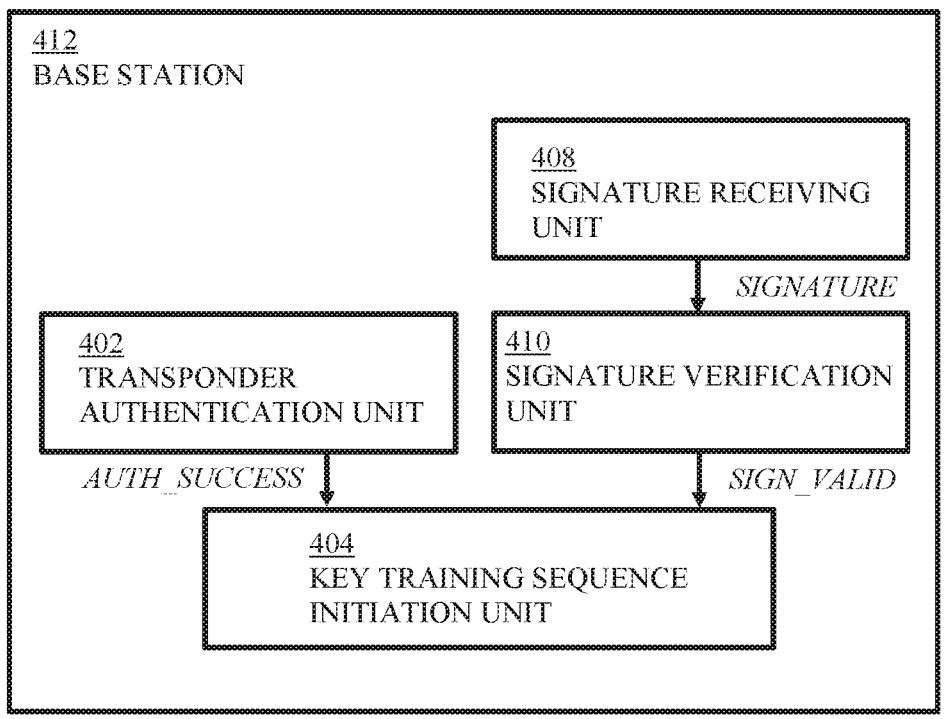
FIG. 4C shows a further illustrative embodiment of a base station.

FIG. 4C shows a further illustrative embodiment of a base station 412. The base station 412 comprises a transponder authentication unit 402 which is operatively coupled to a key training sequence initiation unit 404. Furthermore, the transponder 412 comprises a signature receiving unit 408 which is operatively coupled to a signature verification unit 410. The signature verification unit 410 is operatively coupled to the key training sequence initiation unit 404. The units 402, 404, 408, 410 may be implemented as least partially as a computer program. Furthermore, some hardware may be used, for example to implement the signature receiving unit 408. In operation, the transponder authentication unit 402 participates in and/or enables an authentication procedure between the base station and a transponder (not shown). Furthermore, the transponder authentication unit 402 transmits a signal indicative of authentication success or failure to the key training sequence initiation unit 404. Furthermore, the signature receiving unit 408 receives a signature derived from a PUF from the transponder, and forwards the received signature to the signature verification unit 410. The signature verification unit 410 verifies the signature and transmits a signal indicative of a valid or invalid signature to the key training sequence initiation unit 404. In this embodiment, the key training sequence initiation unit 404 initiates a key training sequence if the signal provided by the transponder authentication unit 402 indicates that the authentication procedure has been successful and if the signal provided by the signature verification unit 410 indicates that the signature is valid. This embodiment supports the method shown in FIG. 2D.

Thus, in accordance with an aspect of the present disclosure, a base station comprises a key training sequence initiation unit, said key training sequence initiation unit being configured to initiate a key training sequence between the base station and a transponder in dependence on a result of verifying a signature derived from a physical unclonable function. This base station efficiently supports the presently disclosed methods. Furthermore, in an embodiment, the key training sequence initiation unit is configured to initiate said key training sequence if an authentication procedure between the transponder and the base station is successful, wherein the success of the authentication procedure is dependent on the result of verifying the signature. This embodiment supports a practical and efficient implementation. Furthermore, in an embodiment, the base station further comprises a signature receiving unit configured to receive the signature from the transponder and a signature verification unit configured to verify the received signature. This embodiment supports another practical and efficient implementation.

Figure 5A:
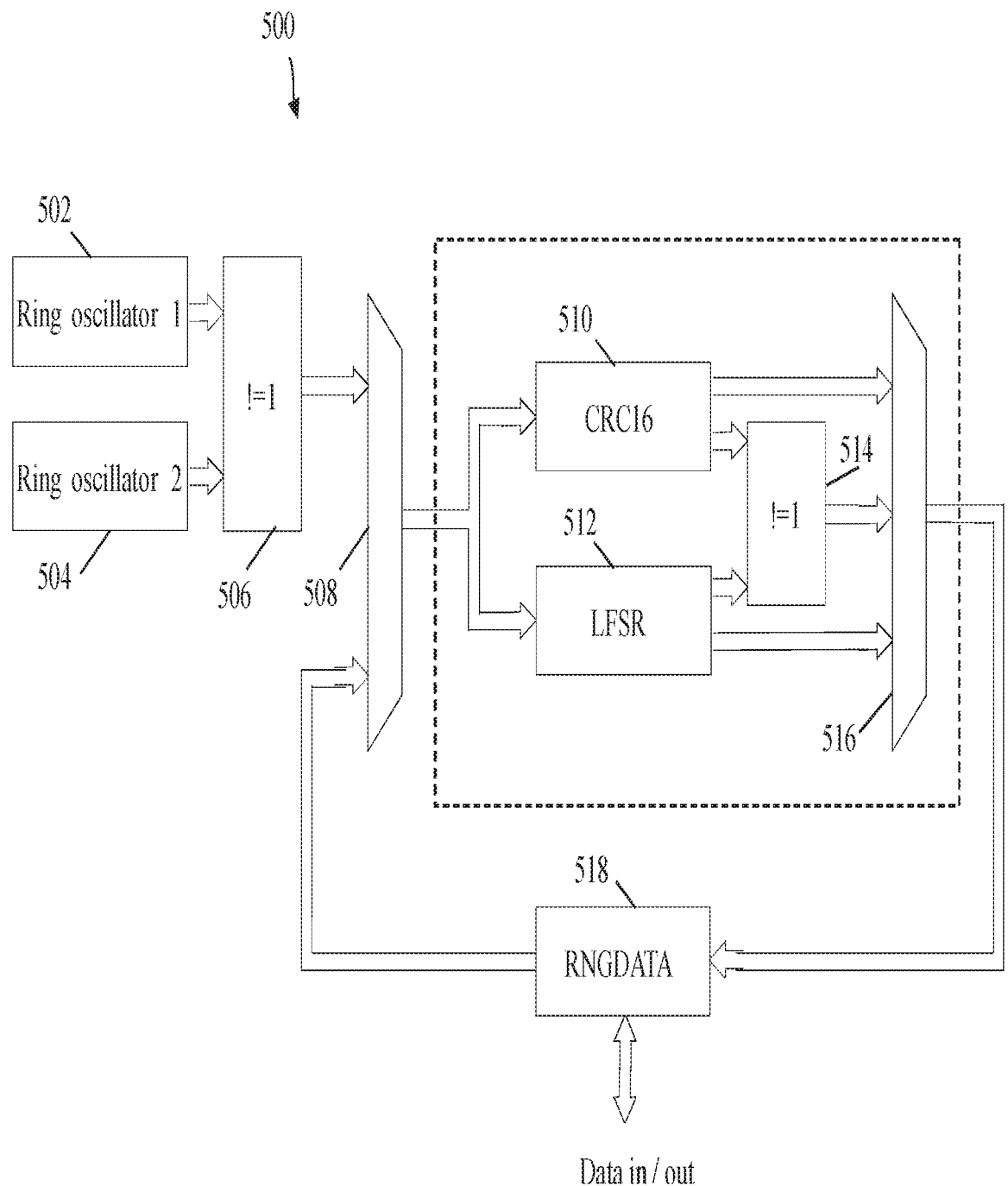
FIG. 5A shows an illustrative embodiment of a random number generator.

FIG. 5A shows an illustrative embodiment of a random number generator 500. The random number generator 500 may be used as a seed generator for Advanced Encryption Standard (AES) calculations, for example. The random number generator 500 can be used as a not-deterministic random number generator (NRNG) and as a pseudo random number generator (PRNG). In this example, all generated random numbers have a size of 16 bits. The NRNG is also suitable to generate a seed for the PRNG for fast generation of subsequent random numbers. Two free running ring oscillators 502, 504 serve as an entropy source. Performing an XOR operation 506 on these two signals, a random bit stream is generated, from which a configured number of bits is sampled. These bits are shifted in a 16-bit cyclic redundancy check (CRC) register 510 or in a 16-bit linear feedback shift register (LFSR) 512, where they are postprocessed. The oscillating entropy signal coming from the ring oscillators 502, 504 is post-processed to increase the amount of random numbers that can be generated. In this example, three post-processing approaches are available: (1) 16-bit cyclic redundancy check register (CRC16), (2) 16-bit linear feedback shift register (LFSR), and (3) both the CRC16 and the LFSR register (hybrid mode). In the first two cases the 16-bit random number is read out directly from the registers, while in the third case the random number is generated by an XOR operation 514 on the values of both registers. The random number generator data register RNGDATA 518 provides access to both the CRC register 510 and the LFSR 512. It enables reading 16-bit random numbers or seeding the RNG with an initial value. The random number generator data register RNGDATA 518 provides byte and word access. The register RNGDATA 518 is read either from the CRC16 register 510 or from the LFSR 512, depending on a configuration setting. When writing seed data to the register RNGDATA 518, the value is assigned to either one of or both the CRC16 register 510 and the LFSR 512, depending on a configuration setting. Reading from and writing to the register RNGDATA 518 is in some example embodiments only allowed when the random number generator 500 is not running. In accordance with the present disclosure, the combined output of the ring oscillators 502, 504 represents a physical unclonable function of the transponder.

Figure 5B:
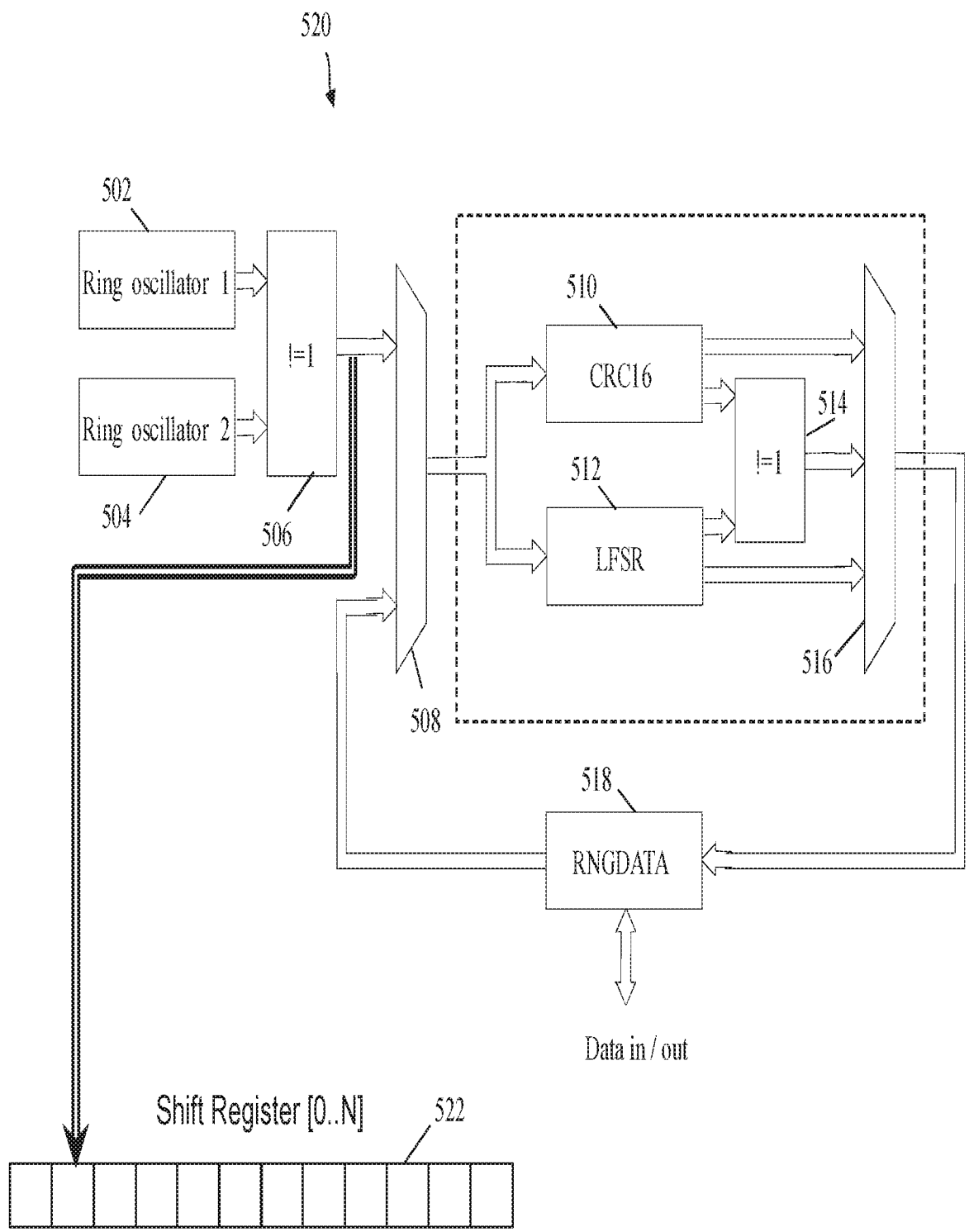
FIG. 5B shows another illustrative embodiment of a random number generator.

FIG. 5B shows another illustrative embodiment of a random number generator 520. In addition to the components already shown in and described with reference to FIG. 5A, the random number generator 520 comprises a shift register 522. In operation, the data stream that is output by the XOR function 506 forms the input of the shift register 522. The bit stream is in some example embodiments always generated after enabling the random number generator 520, in order to deliver almost the same bit stream every time. In this example, the bit stream represents the signature of the physical unclonable function.

Figure 5C:
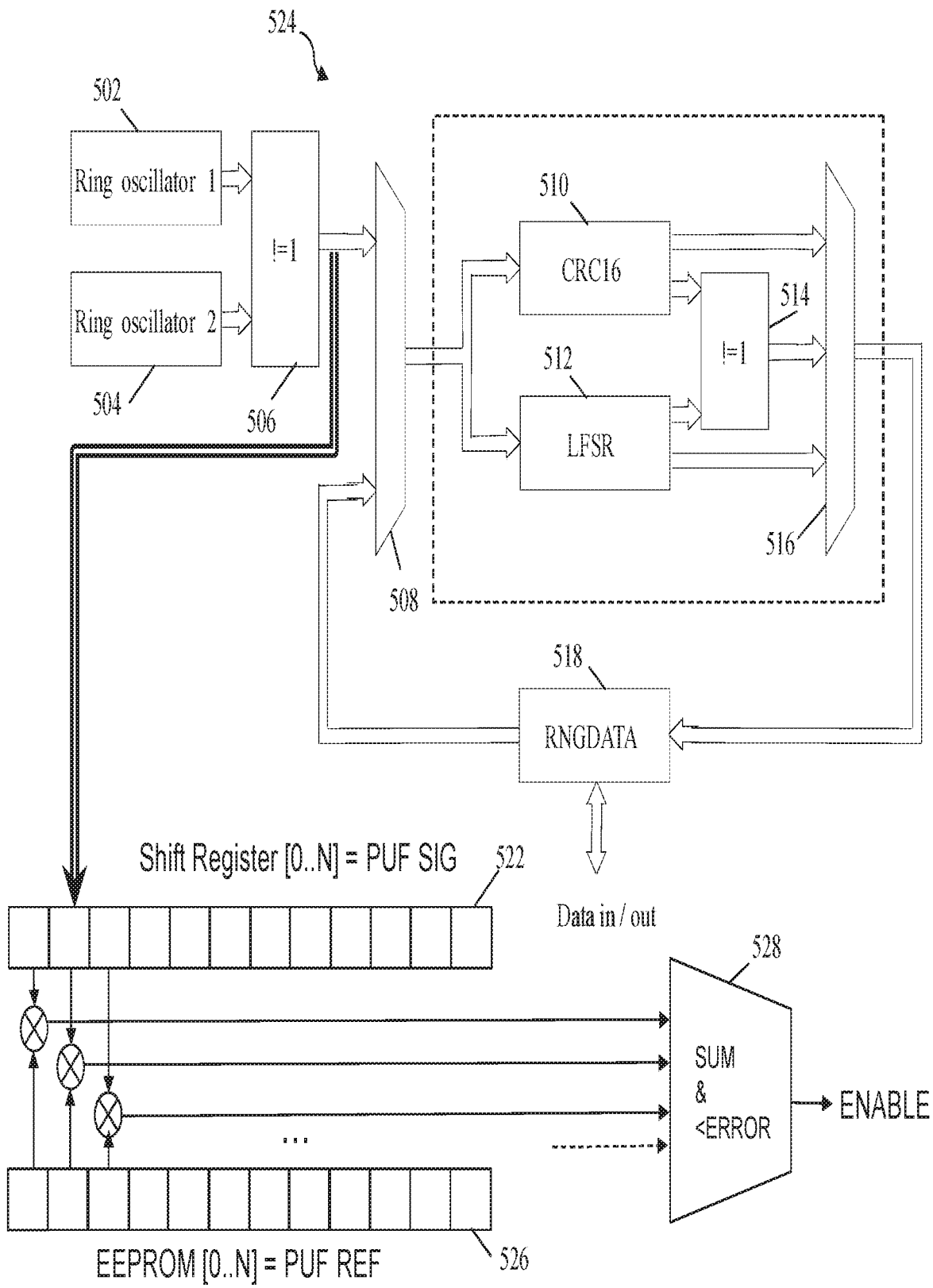
FIG. 5C shows a further illustrative embodiment of a random number generator and a verification unit for a PUF signature.

FIG. 5C shows a further illustrative embodiment of a random number generator 524 and a verification unit for the PUF signature. The verification unit comprises a reference value 526 stored in a memory (i.e., an EEPROM) and a sum-and-compare unit 528. The sum-and-compare unit 528 is configured to generate an enable signal if the value in the shift register 522 matches the reference value 526 to a sufficient degree, more specifically if the number of mismatches between individual bits of the two values 522, 526 is below a predefined threshold. The threshold may be fixed or reconfigurable. As described above, the enable signal may be used to enable a key training sequence between a base station and a transponder. Accordingly, the random number generator 524 and the verification unit for the PUF signature may be integrated into a transponder (not shown). The reference value 526 may be stored in the EEPROM during a production process of the IC in a production test mode.

Figure 6A:
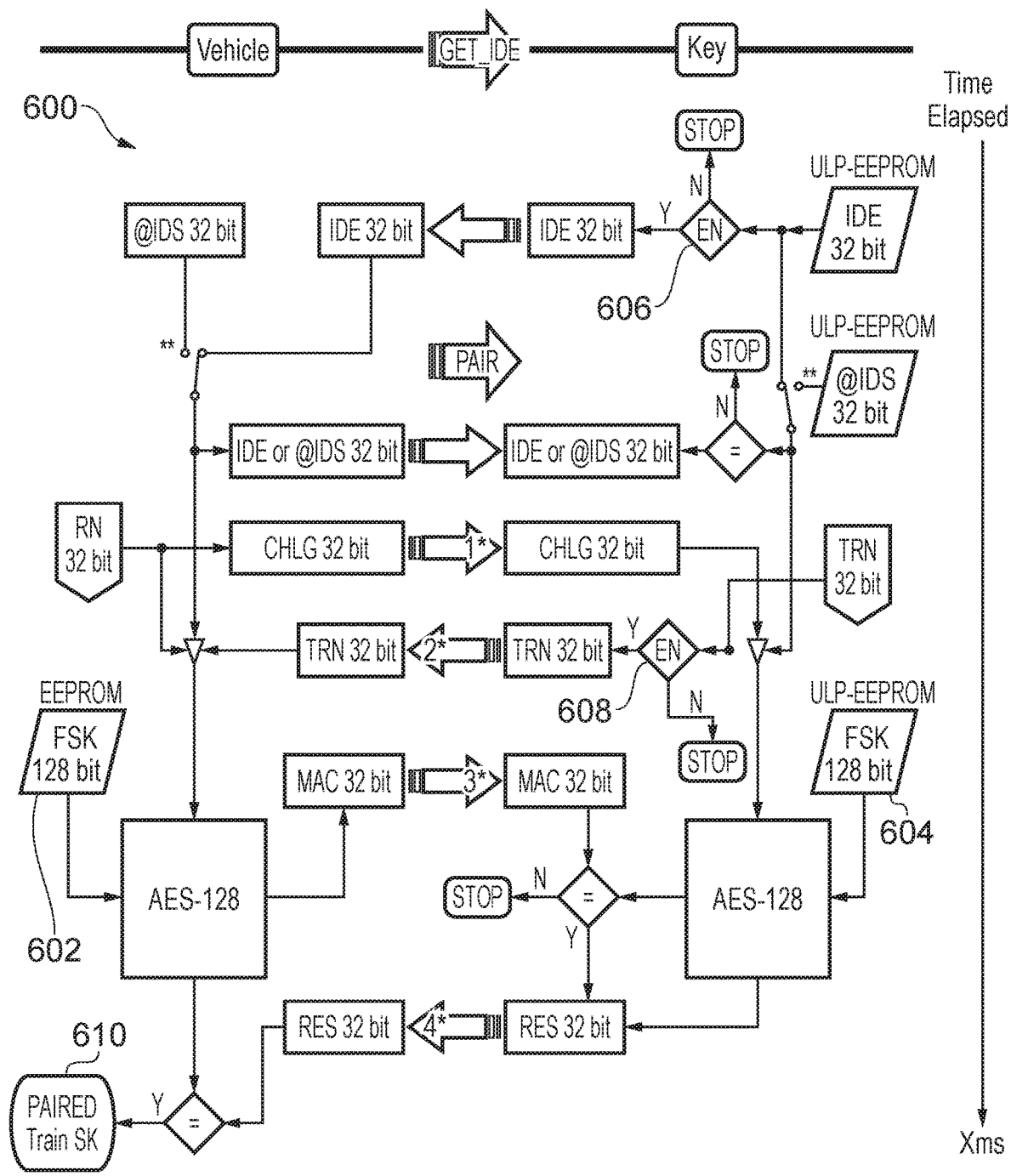
FIG. 6A shows a further illustrative embodiment of a method for configuring a transponder.

FIG. 6A shows a further illustrative embodiment of a method 600 for configuring a transponder. In particular, an authentication procedure (i.e., a "pairing" procedure) between a base station embedded in a vehicle and a transponder embedded in a vehicle access device ("key") is shown. The authentication procedure can only succeed if a factory-programmed secret key 602 stored in the base station matches a factory-programmed secret key 604 stored in the transponder. In addition, in accordance with an embodiment of the presently disclosed method, enable signal checks 606, 608 are performed at different stages of the authentication procedure. In particular, the transponder proceeds to authentication to the base station only if the enable signal indications a positive result of verifying the PUF signature. If the authentication procedure is successful, the base station initiates 610 the key training sequence. The method 600 is a detailed implementation of the method 208 shown in FIG. 2B.

Figure 6B:
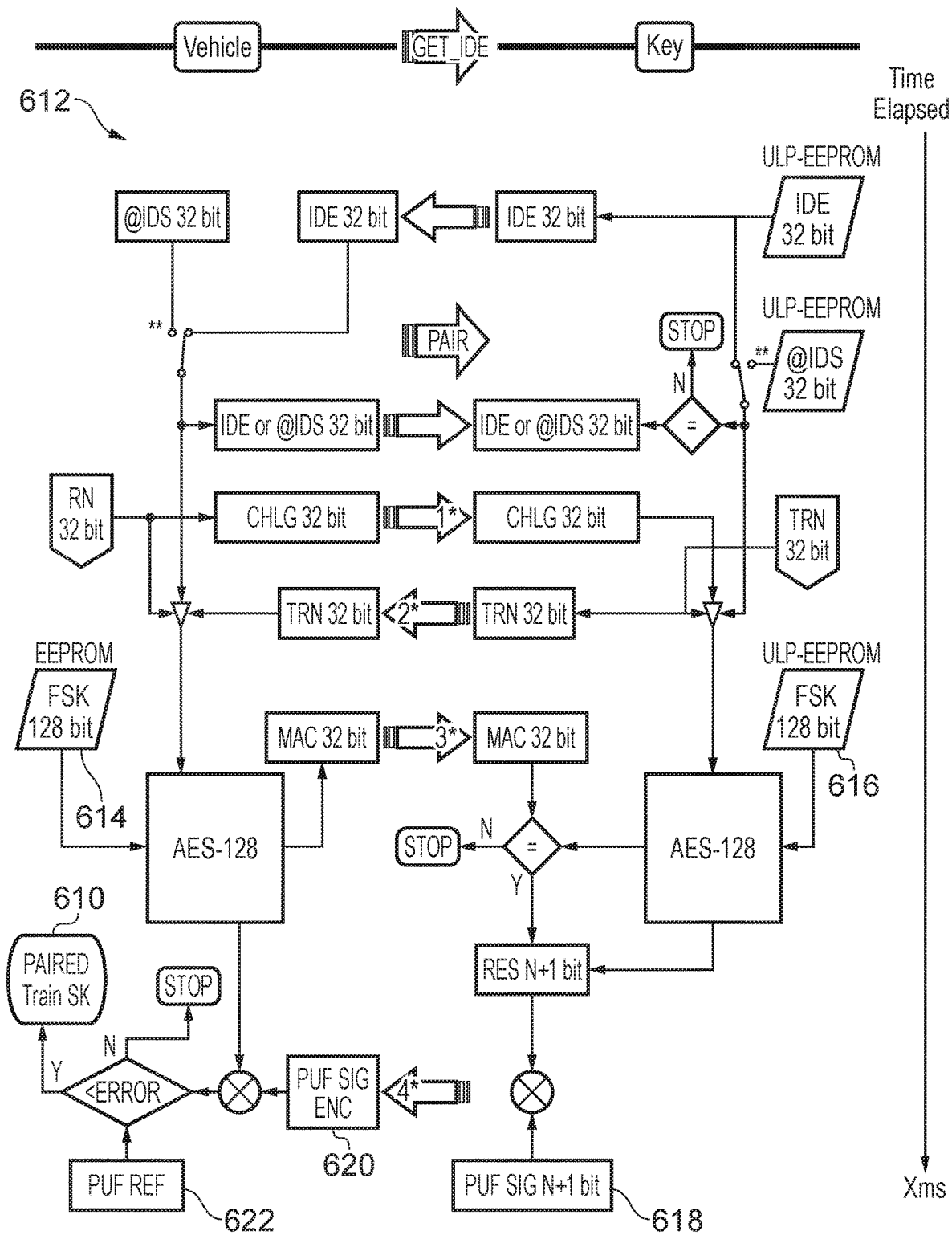
FIG. 6B shows a further illustrative embodiment of a method for configuring a transponder.

FIG. 6B shows a further illustrative embodiment of a method 612 for configuring a transponder. In particular, an authentication procedure (i.e., a "pairing" procedure) between a base station embedded in a vehicle and a transponder embedded in a vehicle access device ("key") is shown. The authentication procedure can only succeed if a factory-programmed secret key 614 stored in the base station matches a factory-programmed secret key 616 stored in the transponder. In addition, in accordance with an embodiment of the presently disclosed method, a PUF signature 618 is transmitted by the transponder to the base station. The PUF signature 618 is encrypted before it is transmitted, so that the base station receives an encrypted PUF signature 620. Subsequently, the base station decrypts the received encrypted PUF signature 620 and compares the resulting decrypted PUF signature with a PUF signature reference value 622. If the decrypted PUF signature matches the PUF signature reference value 622 to a sufficient extent, the base station initiates 610 the key training sequence. The method 612 is a detailed implementation of the method 216 shown in FIG. 2C.

Figure 6C:
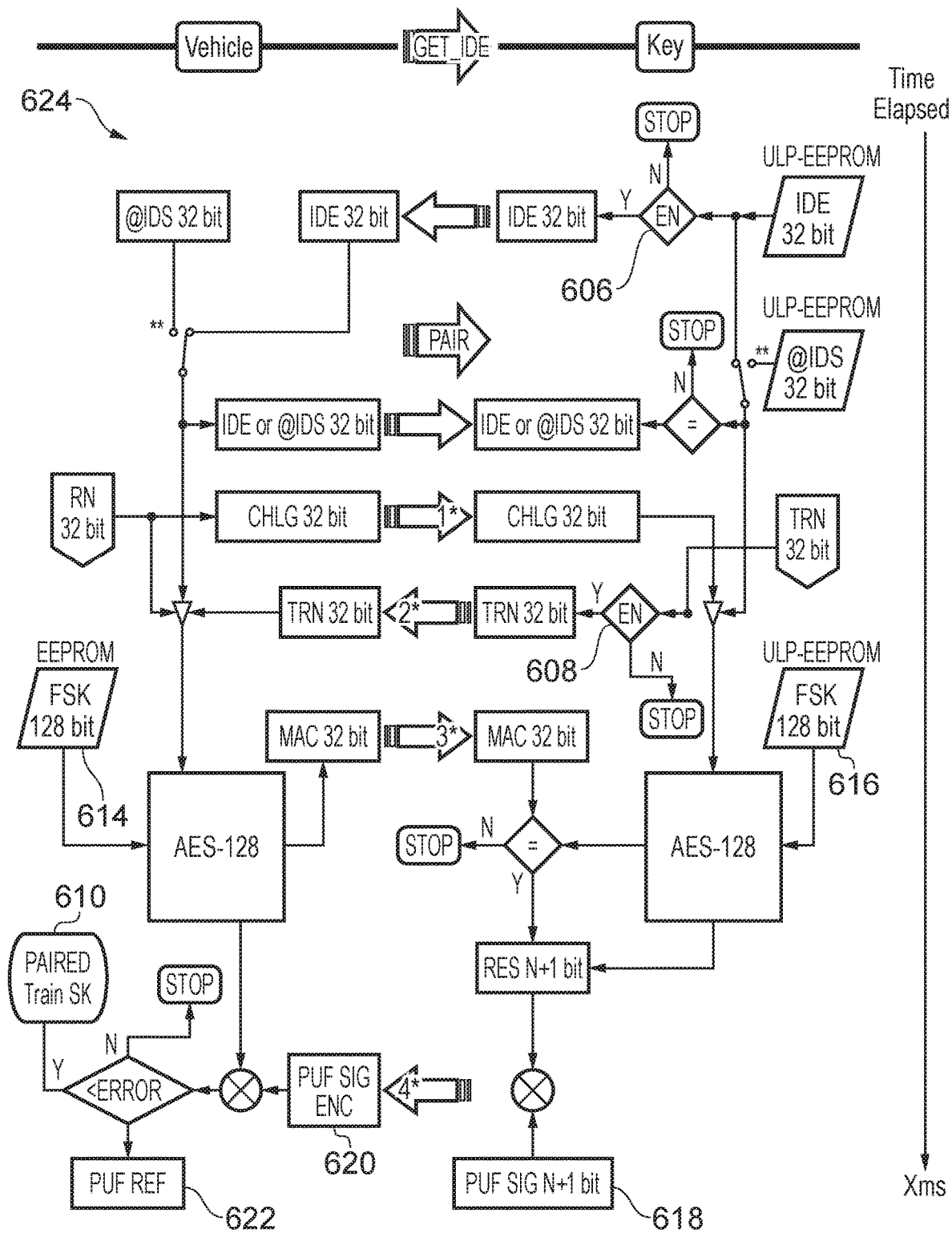
FIG. 6C shows a further illustrative embodiment of a method for configuring a transponder.

FIG. 6C shows a further illustrative embodiment of a method 624 for configuring a transponder. In particular, an authentication procedure (i.e., a "pairing" procedure) between a base station embedded in a vehicle and a transponder embedded in a vehicle access device ("key") is shown. The authentication procedure can only succeed if a factory-programmed secret key 614 stored in the base station matches a factory-programmed secret key 616 stored in the transponder. In addition, in accordance with an embodiment of the presently disclosed method, enable signal checks 606, 608 are performed at different stages of the authentication procedure. In particular, the transponder proceeds to authentication to the base station only if the enable signal indications a positive result of verifying the PUF signature. Furthermore, a PUF signature 618 is transmitted by the transponder to the base station. The PUF signature 618 is encrypted before it is transmitted, so that the base station receives an encrypted PUF signature 620. Subsequently, the base station decrypts the received encrypted PUF signature 620 and compares the resulting decrypted PUF signature with a PUF signature reference value 622. If the authentication procedure is successful and if the decrypted PUF signature matches the PUF signature reference value 622 to a sufficient extent, the base station initiates 610 the key training sequence. The method 624 is a detailed implementation of the method 222 shown in FIG. 2D.

Figure 7:
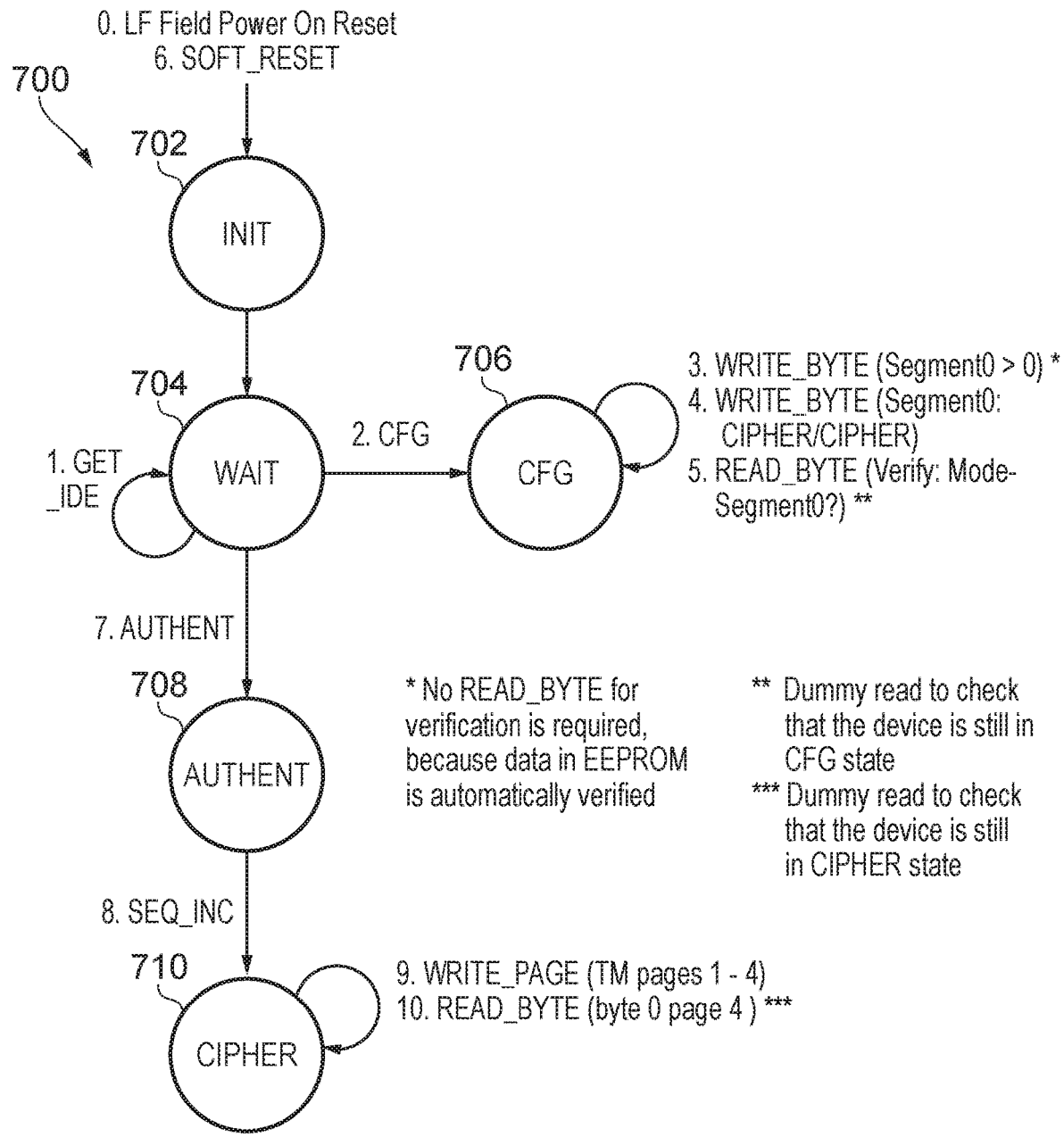
FIG. 7 shows an illustrative embodiment of a key training sequence.

FIG. 7 shows an illustrative embodiment of a final secret key generation process 700. In particular, steps (8) to (10) form a key training sequence of the kind that may be initiated by the base station in dependence on a result of verifying the PUF signature. Furthermore, step (7) comprises an authentication procedure of the kind set forth. The process 700 comprises the following steps.

0) An initial "LF Field Power On Reset" event happens when the LF field is switched on, or it may be forced by an interruption of the LF field for at least $t_{RESET,SETUP}$. After expiration of the start-up time in the INIT state 702, the WAIT state 704 is entered.

1) A GET_IDE command is transmitted to the transponder. The transponder responds with its IDE, which is stored in a random access memory (RAM) of the base station, because it is used later as "device address" for the CFG, PLAIN and AUTHENT commands. At the end of a successful personalization, the IDE is stored in the non-volatile memory of the base station, such that it can be used to verify the identity of the transponder in the field.

2) A CFG command is sent to the transponder to force a transition from the WAIT state 704 to the CFG state 706.

3) The Segment Size of Segment 0 is set to the desired size using a WRITE_BYTE command.

4) The Segment Access Mode for Segment 0 is configured using a WRITE_BYTE command. The Segment Access Mode is set to CIPHER read/CIPHER write access mode during the personalization.

5) A READ_BYTE command is used to check if the device is still in CFG state 706.

6) After a SOFT_RESET command the new configuration for Segment 0 is activated. Upon SOFT_RESET, the transponder loads the transponder configuration data from the ULP-EEPROM to RAM in the INIT state 702. Finally, after termination of $t_{INITSTATE\_SR}$, the WAIT state 704 is entered and the defined segment is ready for access.

7) An AUTHENT command, addressing Segment 0, initializes a four-pass mutual authentication between the transponder and the base station. After successful authentication, the AUTHENT state 708 is entered.

8) A SEQ_INC command is used to enter CIPHER state 710 and to get access to the memory.

9) Finally, in the CIPHER state 710, an Immobilizer Secret Key (ISK) is written in CIPHERED communication using WRITE PAGE commands for pages 1, 2, 3 and 4 of the transponder memory.

10) A READ_BYTE command for byte 0 of page 4 is sent; it acts as a dummy READ command to check whether the preceding WRITE commands were executed correctly.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 base station
102 transponder
200 method for configuring a transponder
202 deriving a signature from a physical unclonable function
204 verifying the signature
206 initiating a key training sequence in dependence on the verification result
208 method for configuring a transponder
210 transponder derives a signature from a physical unclonable function
212 transponder verifies the signature and proceeds to authenticate to base station if signature is valid
214 base station initiates key training sequence if authentication is successful
216 method for configuring a transponder
218 transponder transmits the signature to the base station
220 base station verifies the signature and initiates key training sequence if the signature is valid
222 method for configuring a transponder
224 base station verifies the signature and initiates key training sequence if the signature is valid and if authentication is successful
300 transponder
302 signature derivation unit
304 signature verification unit
306 transponder
308 signature transmission unit
310 transponder
400 base station
402 transponder authentication unit
404 key training sequence initiation unit
406 base station
408 signature receiving unit
410 signature verification unit
412 base station
500 random number generator
502 first ring oscillator
504 second ring oscillator
506 XOR function
508 multiplexer
510 cyclic redundancy check register
512 linear feedback shift register
514 XOR function
516 multiplexer
518 random number generator data register
520 random number generator
522 shift register
524 random number generator
526 reference value
528 sum-and-compare unit
600 method for configuring a transponder
602 secret key
604 secret key
606 enable signal check
608 enable signal check
610 initiate key training sequence
612 method for configuring a transponder
614 factory-programmed secret key
616 factory-programmed secret key
618 PUF signature
620 encrypted PUF signature
622 PUF signature reference value
624 method for configuring a transponder
700 key training sequence
702 INIT state
704 WAIT state
706 CFG state
708 AUTHENT state
710 CIPHER state

LIST OF ACRONYMS

AES advanced encryption standard
CFG configuration
CHLG challenge
CRC cyclic redundancy check
EEPROM electrically erasable programmable read-only memory
FSK factory-programmed secret key
IDE identifier
IDS identifier select
LFSR linear-feedback shift register
MAC message authentication code
RES response
RN random number
RNGDATA random number data register
PUF physical unclonable function
TRN true random number
ULP ultra-low power

The invention claimed is:

1. A method for configuring a transponder, comprising:
deriving a signature from a physical unclonable function;
verifying said signature and sending said signature to a base station; and
verifying the received signature based on a matching of the received signature with a stored reference value, and upon successful verification of the signature by the base station, the base station initiating a key training sequence between the base station and the transponder, wherein the matching is successful when a number of mismatched bits are below a predefined threshold.

2. The method of claim 1, wherein the key training sequence is initiated if an authentication procedure between the transponder and the base station is successful, and wherein the success of the authentication procedure is dependent on the result of verifying the signature.

3. The method of claim 2, wherein the authentication procedure uses secret keys stored in the transponder and in the base station.

4. The method of claim 2, wherein the transponder generates an enable signal in dependence on the result of verifying the signature, and proceeds to authenticate to the base station if the enable signal indicates a positive verification result.

5. The method of claim 4, wherein the transponder generates the enable signal by a bit-wise matching of the signature with a stored reference signal.

6. The method of claim 1, wherein the transponder transmits the signature to the base station and the base station verifies said signature.

7. The method of claim 6, wherein the transponder transmits the signature to the base station in encrypted form.

8. A computer program comprising non-transient executable instructions that, when executed, carry out the method of claim 1.

9. A transponder comprising:
a signature derivation unit configured to derive a signature from a physical unclonable function;
the transponder further comprising:
    a signature verification unit configured to verify said signature and generate an enable signal in dependence on a result of verifying the signature, wherein the transponder is configured to proceed to authenticate to a base station in response to the enable signal indicating a positive verification result; and
    a signature transmission unit configured to transmit the signature to said base station based on the enable signal and causing the base station to verify the signature based on a matching of the received signature with a stored reference value, wherein the matching is successful when a number of mismatched bits are below a predefined threshold.

10. A vehicle access device comprising the transponder of claim 9.

11. A base station comprising a key training sequence initiation unit, said key training sequence initiation unit being configured to initiate a key training sequence between the base station and a transponder in dependence on a result of verifying a signature derived from a physical unclonable function, wherein the base station is configured to receive and verifying the signature from the transponder, wherein verifying the received signagure includes matching the received signature with a stored reference value and the matching is successful when a number of mismatched bits are below a predefined threshold.

12. The base station of claim 11, wherein the key training sequence initiation unit is configured to initiate said key training sequence if an authentication procedure between the transponder and the base station is successful, and wherein the success of the authentication procedure is dependent on the result of verifying the signature.

13. The base station of claim 11, wherein the base station further comprises a signature receiving unit configured to receive the signature from the transponder and a signature verification unit configured to verify the received signature.

14. A vehicle comprising the base station of claim 11.

* * * * *